United States Patent [19]
Feldbaumer et al.

[11] Patent Number: 5,438,527
[45] Date of Patent: Aug. 1, 1995

[54] YIELD SURFACE MODELING METHODOLOGY

[75] Inventors: David W. Feldbaumer, Chandler; Eric Maass, Mesa, both of Ariz.

[73] Assignee: Motorola, Inc., Schaumburg, Ill.

[21] Appl. No.: 392,664

[22] Filed: Feb. 23, 1995

Related U.S. Application Data

[63] Continuation of Ser. No. 247,608, May 23, 1994, abandoned, which is a continuation of Ser. No. 628,781, Dec. 17, 1990, abandoned.

[51] Int. Cl.$^6$ ............................................. G06F 17/00
[52] U.S. Cl. ................................................... 364/578
[58] Field of Search .................... 364/578, 488, 490

[56] References Cited

U.S. PATENT DOCUMENTS

| | | | |
|---|---|---|---|
| 3,751,647 | 8/1973 | Maeder et al. | 364/490 |
| 5,067,101 | 11/1991 | Kunikiyo et al. | 364/578 |
| 5,070,469 | 12/1991 | Kunikiyo et al. | 364/578 |

OTHER PUBLICATIONS

Hacever et al; "Parametric Yield Optimization For MOS Circuit Blocks"; IEEE CAD 1988.
Alvarez; "Application of Statistical Design and Response Surface Methods to Computer-Aided VLSI device Design"; IEEE CAD 1988.

*Primary Examiner*—Ellis B. Ramirez
*Attorney, Agent, or Firm*—Rennie William Dover; Robert D. Atkins; Michael D. Bingham

[57] ABSTRACT

A method for predicting yields for integrated circuit designs for given specification limits and process variations with respect to transistor parametric variations is based on a stastical analysis starting with response surface modeling techniques that relate desired circuit outcomes as a function of a set of defined independent variables. The response surfaces are converted to discrete $C_{pk}$ surfaces for all combinations of the independent variables. The $C_{pk}$ surfaces are next converted to discrete percent yield surfaces for each of the circuit outcomes which then are combined to provide a composite yield surface comprising all desired parametric operating points of the outcomes that may be used to predict the circuit yield.

4 Claims, 6 Drawing Sheets

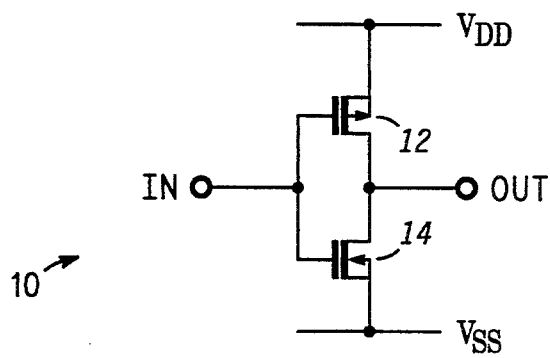
*FIG. 1*
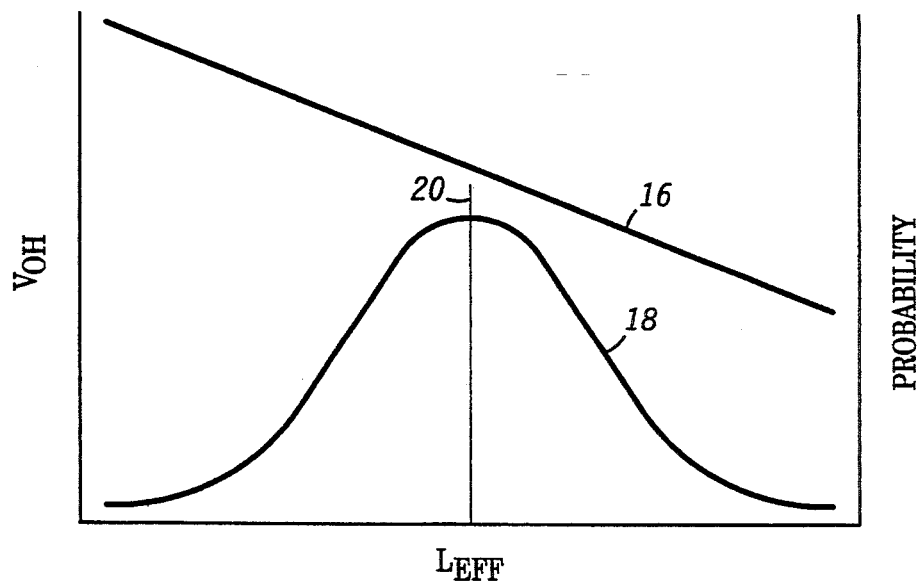
*FIG. 2*
*FIG. 3*
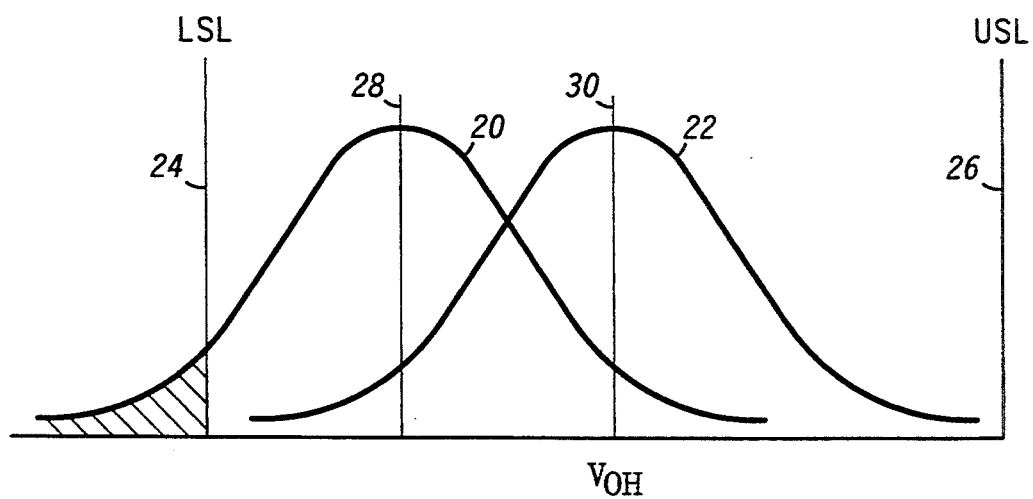

5,438,527

YIELD SURFACE MODELING METHODOLOGY

This application is a continuation of prior application Ser. No. 08/247,608, filed May 23, 1994 now abandoned; which is a continuation 07/628,781, filed Dec. 17, 1990 now abandoned.

BACKGROUND OF THE INVENTION

The present invention relates to a yield analysis tool useful in the production of integrated circuits, as one example, and to such methodology to predict product yield with a given circuit specification in order to increase production yields.

It is essential for integrated circuit (IC) manufacturers to understand the yield behavior of their product lines in order to increase profitability in the face of decreasing selling prices. Statistical methods in combination with simulation programs have been used in the past for providing IC system analysis and characterization in an attempt to predict and/or improve circuit yields.

A typical statistical methodology for characterizing integrated circuits is taught by G. E. Box and N. R. Draper, Empirical Model-building and Response Surface, Wiley, 1987, as an example, and is generally referred to as Response Surface Modeling (RSM). In RSM methodology, certain desired output characteristics of an IC are related to a function of independent variables using known statistical methods. Typically, a designed experiment either by using a simulator or through wafer processing is used to produce a regression equation model to fit a desired circuit characteristic in equation form to the independent variables. For instance, understanding how circuit performance relates to transistor properties and design variables is very valuable since the better these relationships are understood, the more likely a successful match between circuit requirements and IC process capability can be achieved.

The RSM technique provides a picture of the foregoing relationships in a response surface form to allow simple inspection to determine if an acceptable operating point for the circuit exists. The ideal operating target would be located at a midpoint between opposing specification limits in the a parametric space. Parametric space is defined as a multi-dimensional coordinate system with each axis defining one independent variable. Using RSM, a two dimensional response surface can be generated for various outcomes from the generation of regression equations for each of the outcomes desired. As taught by Alvarez, Abdi and Young in their article titled "Application of Statistical Design and Response Surface Methods to Computer-Aided VLSI Device Design, IEEE Trans., on Computer-Aided Design, Vol. 7, 2,1988, the response surfaces can be overlaid to identify if an acceptable operating region exists. Unfortunately, this technique only identifies the existence of such an operating point, but does not translate this into an estimate of yield for the particular circuit. Hence, characterization of new circuits and processes using RSM techniques can identify the existence of a region where all performance limits are satisfied by some combination of transistor properties and design alternatives. However, this technique does not take into account of unavoidable process variations and the effect thereof on actual circuit yields.

Therefore, as will be more fully explained, it is the object of the subject invention to provide a technique for predicting IC yield wherein an empirical relationship between a circuit-level outcome and transistor-level properties can be converted directly into "parametric yield", parametric yield is defined as the proportion of product which is in conformance with all specification limits minus that which fails solely due to unacceptable transistor parametric values. Thus, it is equivalent to the performance-limited yield in an ideal defect free environment.

SUMMARY OF THE INVENTION

In accordance with the present invention there is provided a method for providing the selection of an optimum parametric operating point of an operational system to maximize yields of such system to a required specification wherein the system has a given number of outcomes associated therewith that are a function of a given set of independent variables, comprising the steps of determining a regression or functional model for each outcome as a function of the given set of independent variables; converting each regression or functional model to a normalized process capability index value for all combinations of the independent variables; converting each of the process capability index values to a corresponding percent yield value for all combinations of the independent variables thereby forming a percent yield surface; and combining certain ones or all of the percent yield surfaces into a composite yield surface containing all potential parametric operating points of the outcomes with respect to expected parametric variations of the set of independent variables to provide evaluation of the percent yield of the system.

It is a feature of the present invention that the yield surface modeling methodology described above can be utilized for evaluating and optimizing integrated circuit yields with respect to transistor parametric variations resulting from variations in the process for fabricating the integrated circuits.

BRIEF DESCRIPTION OF THE DRAWINGS

FIG. 1 is a schematic diagram of a simple buffer circuit useful in explaining the present invention;

FIG. 2 is a distribution graph useful in explaining a single functional relationship in accordance with the present invention;

FIG. 3 is a distribution graph useful in explaining the present invention;

DETAILED DESCRIPTION OF THE PREFERRED EMBODIMENT

Introduction

Figure 4:
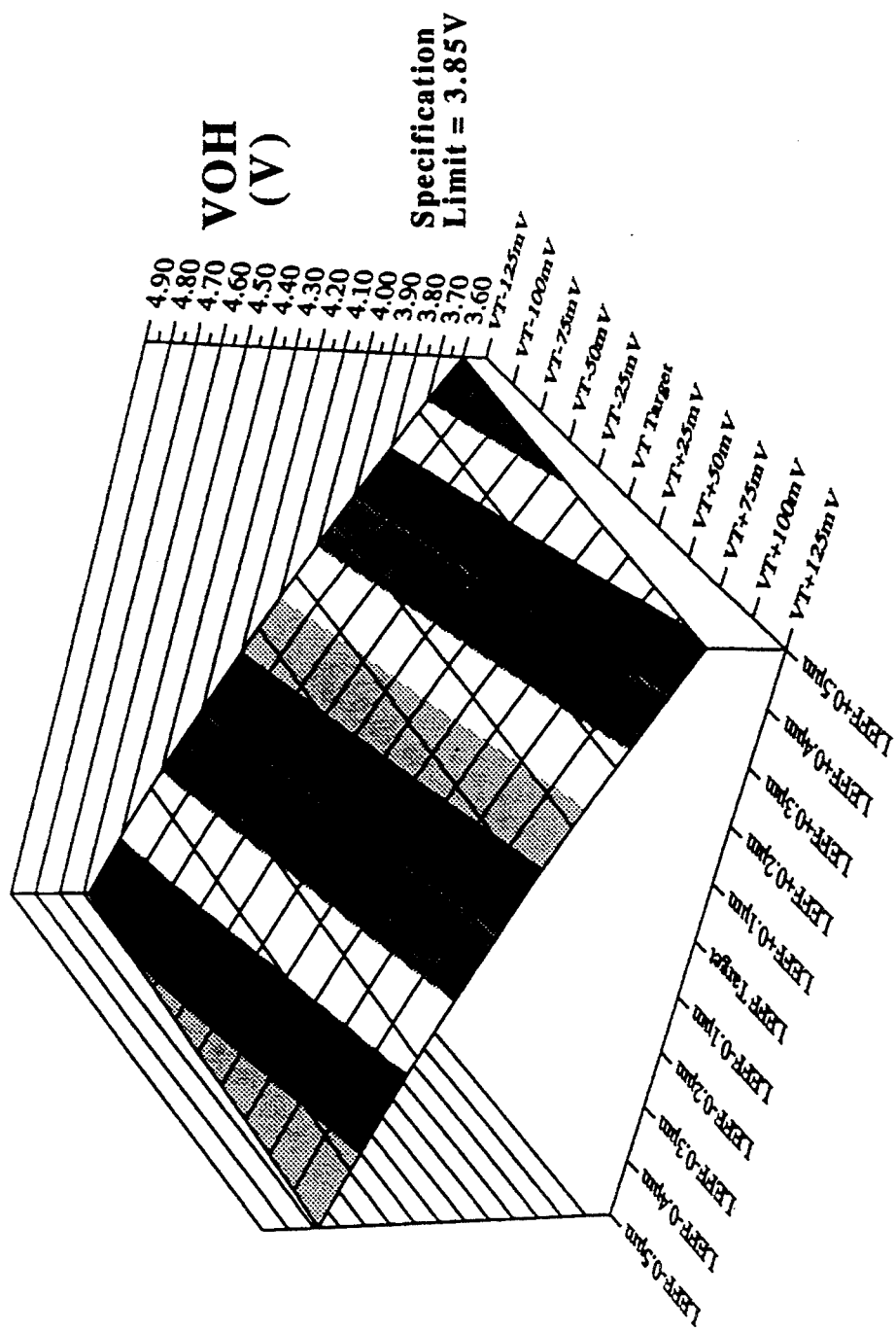
FIG. 4 is a Response Surface of output high voltage level, $V_{OH}$, of the buffer circuit of FIG. 1 generated in accordance with the present invention.

Although the following description is applicable to a myriad of applications in which a system yield is a function of a given set of independent variables the inherent variability of those variables around their respective targets and the specification limits for each system outcome, for explanation purposes the simple integratable buffer circuit of FIG. 1 will be referred to in explaining the present invention. The structure and operation of buffer circuit 10 is well known wherein the buffer circuit comprises a PMOS transistor 12 cascaded with NMOS transistor 14 between $V_{DD}$ and $V_{SS}$. The input to the buffer is connected to the gates of the two transistors while the output is coupled between the source and drain respectively of the PMOS and NMOS transistors.

Integrated circuit yield loss can stem from a multiplicity of causes, the mix and relative impact of which may vary in magnitude over time, thus confounding and obscuring the underlying problems. In spite of continuous effort to identify and reduce all sources of variability, a minimum degree of variation consistent with the integrated circuit manufacturer's process capability will still exist. These natural shifts are apparent in the transistor parametrics such as threshold voltage ($V_T$), channel length ($L_{EFF}$), leakage current and so forth.

The present invention is related to providing and creating a yield analysis tool defined as Yield Surface Modeling (YSM, a trademark of Motorola, Inc.) method. YSM methodology relates key transistor parametrics, and their associated process variability, to total parametric yield. Parametric yield is defined as the yield limited solely by unacceptable transistor parametric variation and does not take into account yield loss due to random defectivity. The resultant yield surface generated in accordance with the present invention is a marriage of the circuit performance, the process variability of the key transistor properties and the specification limit for each and every circuit performance criteria. The uniqueness of YSM is that it allows visualization of overall yield to competing performance indices related to a common set of variables which bound the yield at opposing extremes in the parametric space.

DESCRIPTION OF THE INVENTION

The first step in accomplishing YSM is to establish the fundamental governing relationships between transistor properties, circuit design features and all relevant circuit performance criteria. Examples of the circuit outcomes for the buffer circuit 10 include the propagation delay through the circuit, output high and low voltage levels ($V_{OH}$ and $V_{OL}$), and quiescent leakage current levels as well as others. Regression equations or functional relationships are first derived for each circuit outcome desired as a function of desired circuit independent variables in the manner taught by the J. Neter, W. Wasserman and M. Kutner in their book. Applied Linear Statistical Models, Richard D. Irwin, 1985, through the use of statistical experimental design.

Selection of the appropriate experimental design depends upon one's current knowledge level of the controlling variables. For instance, it is well known in integrated circuit manufacture that the above listed circuit outcomes are functionally dependent on the effective channel length ($L_{EFF}$) of the transistors, the channel threshold voltages ($V_T$), and channel width among others. For brevity, the following discussion will be limited to deriving the regression model for $V_{OH}$, and leakage current ($I_{SS}$) for the circuit containing the buffer circuit of FIG. 1, it being understood that regression equations can be derived for other circuit outcomes in a like manner.

An empirical method for deriving the relationship between $V_{OH}$ and $I_{SS}$, and the independent variables $V_T$ and $L_{EFF}$ is to fabricate the buffer circuit on several wafers and measure the effects of intentional changes of the variables thereon. For example, the experimental levels of the independent variables were set to encompass greater than $\pm 3$ Sigma of the current process variation about the target values of $V_T$ and $L_{EFF}$. Thus, as shown in FIG. 2, a data set over the $L_{EFF}$ process variation wave form 18, can be measured for $V_{OH}$, wave form 16, by running wafer lots through the process with respective process control (PC) test patterns comprising standard transistors as known in the art. Once the wafers have been completed processing, the PC patterns can be conventionally tested with a standard automated parametric tester. The test structures are available on the PC patterns to measure device thresholds, channel length and so forth. Therefore, a circuit $V_{OH}$ measurement is known for each $L_{EFF}$. A mean value of target 20 is known for the $L_{EFF}$ distribution. Similarly, a data set can be derived for $V_{OH}$ as a function of $V_T$. Using regression analysis a regression equation is then derived relating circuit $V_{OH}$ to transistor $L_{EFF}$ and $V_T$. As an example, the general regression equation for $V_{OH}$ would be of the form of:

$$V_{OH} = B0 + B1\ L_{eff} + B2\ V_T + B11(L_{eff})^2 + B22(V_T)^2 + B12(L_{eff}*V_T)$$

where B0, B1, B2, B11, B22 and B12 are constants to fit $V_{OH}$ to meet the data set measured. Likewise, a data set over expected process variation can be derived for $I_{SS}$ (as well as other circuit outcomes). From the data set a regression equation is determined for $I_{SS}$. In fact, a regression equation can be similarly determined for each circuit outcome as a function of a predetermined set of independent variables.

The above description for determining regression equations using response surface methodology, although comprising the first step of the present invention, is well known as taught by the referenced treatise as well as others.

Once a regression or functional model has been determined for all circuit outcomes, i.e., for example, $V_{OH}$ and $I_{SS}$, for each of the significant independent variables, a respective response surface can be plotted. FIG. 4 shows the response surface of $V_{OH}$ of buffer circuit 10 over a range of process variation typical of the factory manufacturing processes as a function of $L_{EFF}$ of the MOS transistor and its associated threshold voltage ($V_T$). FIG. 4 can be generated from any standard graphics spreadsheet and computer such as the commercially available Wing Z spreadsheet. As shown by FIG. 4, the performance of the output buffer of FIG. 1 is precisely quantified over a range of transistor properties on either side of the process targets covering a range consistent with the factory variation. A like response surface can be generated for $I_{SS}$.

Given a known specification limit for each circuit performance, the two dimensional contour response surfaces for each of the desired circuit outcomes can be overlaid to identify if an acceptable operating region for the circuit exists, refer to the aforementioned Alvarez article. Unfortunately, however, this only identifies the existence of such an operating point, but does not translate this into an estimate of yield for the circuit in the manufacturing process. Thus, characterization of new circuits and processes using the aforedescribed response surface modeling techniques can identify the existence of a region where all performance limits are satisfied by some combination of transistor properties and design alternatives. However, the missing ingredient which is required is how much of the unavoidable process variation inherent with current manufacturing equipment is contained within that region of acceptable operation. This points out the major drawback of relying only on the response surface modeling technique by itself.

Referring to FIG. 3, the overall distribution of $V_{OH}$, wave forms 20 and 22 (having a mean value at 28 and 30, respectively), as a function of the independent variables around any target, may or may not extend beyond a lower (LSL) and/or upper (USL) specification limit, 24, 26. Since there is always a degree of parametric variation around a target, yield loss can be minimized by centering the parametric target midway between the opposing specification limits in the parametric space, wave form 22. If the total parametric variation is contained between these two yield cliffs, it would be assured that 100% parametric yield will be achieved. However, typically, centering a single circuit outcome, i.e., $V_{OH}$, between the specification limits does not mean that the other desired circuit outcomes will fall within these limits which is normally the case where process equipment capability is pushed to its limit to produce the highest performance integrated circuits possible. More likely, combinations of the circuit outcomes have to be targeted towards one end of the specification limits in order to achieve circuit performance. Typically, as shown by wave form 20, circuit outcomes such as $V_{OH}$, for example, will need to be adjusted towards one limit or the other in order to find a combination of all circuit outcomes to meet a required circuit performance. In so doing, generally a percentage of the outcomes will fall outside a limit as indicated by the cross-hatched portion.

In a like manner, using the RSM methodology, individual response surfaces can be generated for all desired circuit outcomes as a function of the given set of independent variables. Similarly a response surface for $I_{SS}$, the leakage current for the circuit comprising buffer circuit 10 as a function of $L_{EFF}$ and $V_T$ can be generated. The same technique is used to generate regression models and response surfaces for MOS transistor 14 for buffer circuit 10.

Given that some portion of the parametric distribution transcends a specification boundary, how can circuit yield be predicted? Perhaps the acceptable operating range in the parametric space is only wide enough to accommodate one or two sigma of the process variation on either side of the target. Moreover, even though a large operating region between specification limit boundary exists, there may be no operating point which can deliver profitable yields in the long term. Thus, it is very desirable in the design of integrated circuits to be able to predict circuit yields based on process capabilities; which is the object of the present invention.

Using the yield surface modeling (YSM) methodology of the present invention to be described hereinafter, an empirical relationship between a circuit-level outcome and transistor-level properties can be converted directly into "parametric yield". Parametric yield is defined as the proportion of product which is in conformance with all specification limits minus that which fails solely due to unacceptable transistor parametric values. Yield estimates for several different circuit criteria can be combined to predict overall parametric yield at every point in the parametric space.

Figure 5:
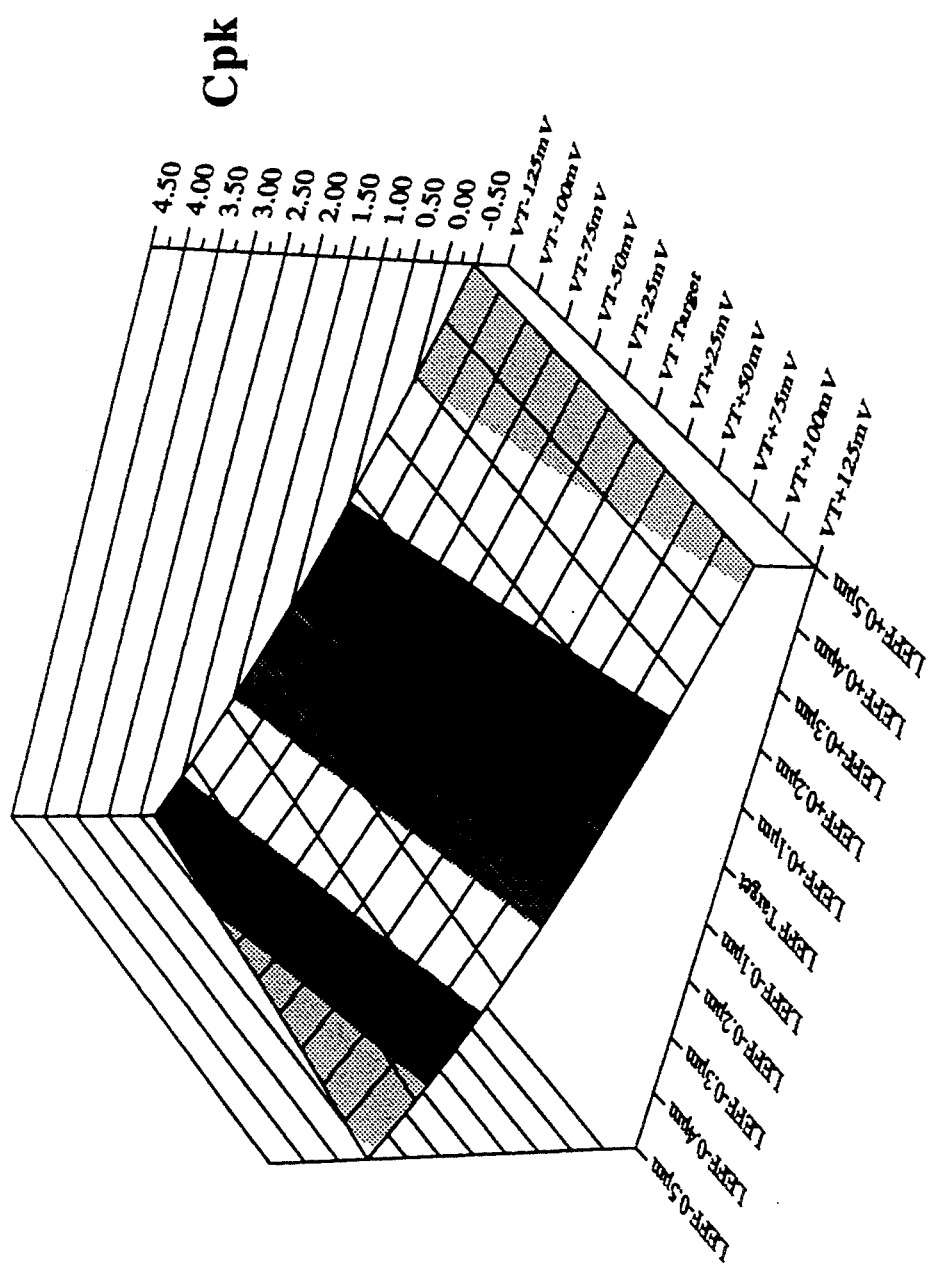
FIG. 5 is a Process Capability Index, $C_{pk}$, Surface of $V_{OH}$ of the buffer circuit of FIG. 1 generated in accordance with the present invention.

Generation of yield surfaces is accomplished by first establishing the fundamental governing relationship between circuit performance and the measurable controlling process variable using RSM as already discussed. Next, each individual circuit outcome is then normalized to its respective specification limit. These standardized relationships must be unit-less in order to compare unlike outcomes on a single scale. The present invention employs a one-sided $C_{pk}$ value to achieve this standardization where $C_{pk}$ is a process capability index as defined, for instance, by V. E. Kane in his paper *Process capability indices*, Journal of Quality Technology, vol. 18, L1986, which takes into account the mean and standard deviation of a particular outcome relative to the upper specification limit and lower specification limit for that same outcome. $C_{pk}$ is therefore defined as:

$$C_{pk} = Z_{min}/3$$

where $Z_{min}$ is the minimum of $(USL-\overline{X})/S$ and $(\overline{X}-LSL)/S$; where $\overline{X}$ and S represent the average response and standard deviation, respectively, of the particular outcome over all production variances. Thus, a $C_{pk}$ value represents the difference between the outcome mean and the nearer outcome specification limit divided by three standard deviations of the outcome distribution. A $C_{pk}$ value of 1.0 would be equivalent to $\pm 3$ sigma process which in turn would predict a 99.87% yield for the particular outcome. For integrated circuits such as buffer circuit 1.0, the specification limits provide only a boundary in one direction. Circuits can only fail by operating too slowly, or leaking too much. The specification limit is either a maximum, as is the case for propagation delays, or a minimum, as is the case for $V_{OH}$, for example. For each particular circuit outcome desired, an appropriate specification limit and polarity is used to determine $C_{pk}$. For instance, the $C_{pk}$ value for $V_{OH}$ at 85° C., having a specification limit of 3.85 V, is equal to:

$$C_{pk} = \frac{(\overline{V_{OH}} - 3.85\ \text{V})}{3 \times S_{VOH}}$$

where $SV_{OH}$ is the standard deviation of the $V_{OH}$ population over all production. It is the intent of the present invention using YSM methodology to predict yield at every coordinate in the parametric space. Using the average response for $V_{OH}$ in the above equation provides a $C_{pk}$ value corresponding only to the process target for each of the independent variables of which the outcome is a function, i.e., $L_{EFF}$ and $V_T$ (among others). However, the present invention is concerned with evaluating the $C_{pk}$ value at every coordinate in the parametric space, not just at the process target. To achieve this, the average response of the particular outcome, in the case for $V_{OH}$, the average value, $\overline{V_{OH}}$, is replaced by the predicted value at each coordinate in the parametric space. This predicted response is based upon the previously defined functional relationships between the transistor properties and the circuit level outcomes obtained by the previously derived regression model for the outcome. Thus, using the response surface generated for the particular circuit outcome, for each value of $V_{OH}$, as an example, a corresponding value for that point can be obtained for the numerator of the above equation. Thus, by substituting the regression model for $V_{OH}$, in place of the average value, $C_{pk}$ can be evaluated over the entire parametric space. However, there is still a missing term required by the $C_{pk}$ equation and that is the estimated standard deviation of the outcome in the denominator. The actual standard deviation can be replaced with an estimate using a statistical theorem known as the propagation of errors as taught in the book entitled "*Statistical Models In Engineering*" by G. J. Hahn & S. S. Shapiro published in 1967 by John Wiley & Sons. Wherein it is taught that the circuit outcome variance is the sum of the squared partial derivatives of the functional relationship with respect to each independent variable multiplied by the process variance of that independent variable. Again, using the regression model equation for an outcome such as $V_{OH}$ and using the propagation of errors technique to estimate the standard deviation, the $C_{pk}$ index value is determined. By automating the equation for $C_{pk}$ in a computer spreadsheet the $C_{pk}$ values for each coordinate in the parametric space can be generated. The regression equation is first evaluated at each coordinate to predict the value of the circuit performance, such as $V_{OH}$. This value is then used in the above equation to calculate $C_{pk}$. If desired a three dimensional $C_{pk}$ surface for each outcome can be generated using the spreadsheet. FIG. 5 is a $C_{pk}$ surface for $V_{OH}$ for buffer circuit 10 at 85° C. versus the MOS transistor channel length and threshold voltage. The vertical axis indicates the $C_{pk}$ value for $V_{OH}$ should the production process be centered at that coordinate in the coordinate parametric space with the known or user selected standard deviations in the target transistor properties.

The next step in the present invention is to convert each $C_{pk}$ surface for each discrete circuit outcome as a function of the set of independent variables into discrete yield surfaces. Once the conversion of a response surface (FIG. 4) to a $C_{pk}$ surface (FIG. 5) has been achieved, the $C_{pk}$ values can be directly converted for each circuit outcome into a percent yield. Referring back to the expression for $C_{pk}$ reveals the similarity of the $C_{pk}$ value to the well known statistical Z-values of a normal curve. The Z-value is calculated as:

$$Z = \frac{|\overline{X} - X_j|}{S_X}$$

where $X_j$ is a particular value of X, $\overline{X}$ is the sample average of X, and $S_X$ is the sample standard deviation of X (see, for example, L. Ott, *An Introduction to Statistical Methods*, PWS Publishers, 1984). The $C_{pk}$ value is therefore Z divided by three. The associated tail probability of a Z- value, or Z- score, can be obtained from a standard statistical table for areas under the normal distribution curve. Alternately, several numerical solutions have been derived to calculate the tail probability directly from the Z score. One such formula is given by Abromowitz and Stegen, in their article, *Handbook of Mathematical Functions*, National Bureau of Standards Applied Mathematics Series No. 55, U.S. Government Printing Office, Washington, D.C. 1964:

$$\text{Tail}(Z) = \frac{\left(\frac{1}{1.033267*Z}\right) * \left(\left(0.43618 - \frac{0.1201676}{1 + 0.33267*Z}\right) + \frac{0.937298}{(1 + 0.33267*Z)^2}\right)}{\sqrt{2\pi} * \exp\left(\frac{Z^2}{2}\right)}$$

Once, the % Tail for Z is derived from such a formula, the $C_{pk}$ value for each point in the parametric space can be converted into tail percentage, which represent the yield directly as:

% Yield = $[1 - \text{Tail}(3*C_{pk})] \times 100\%$

Figure 6:
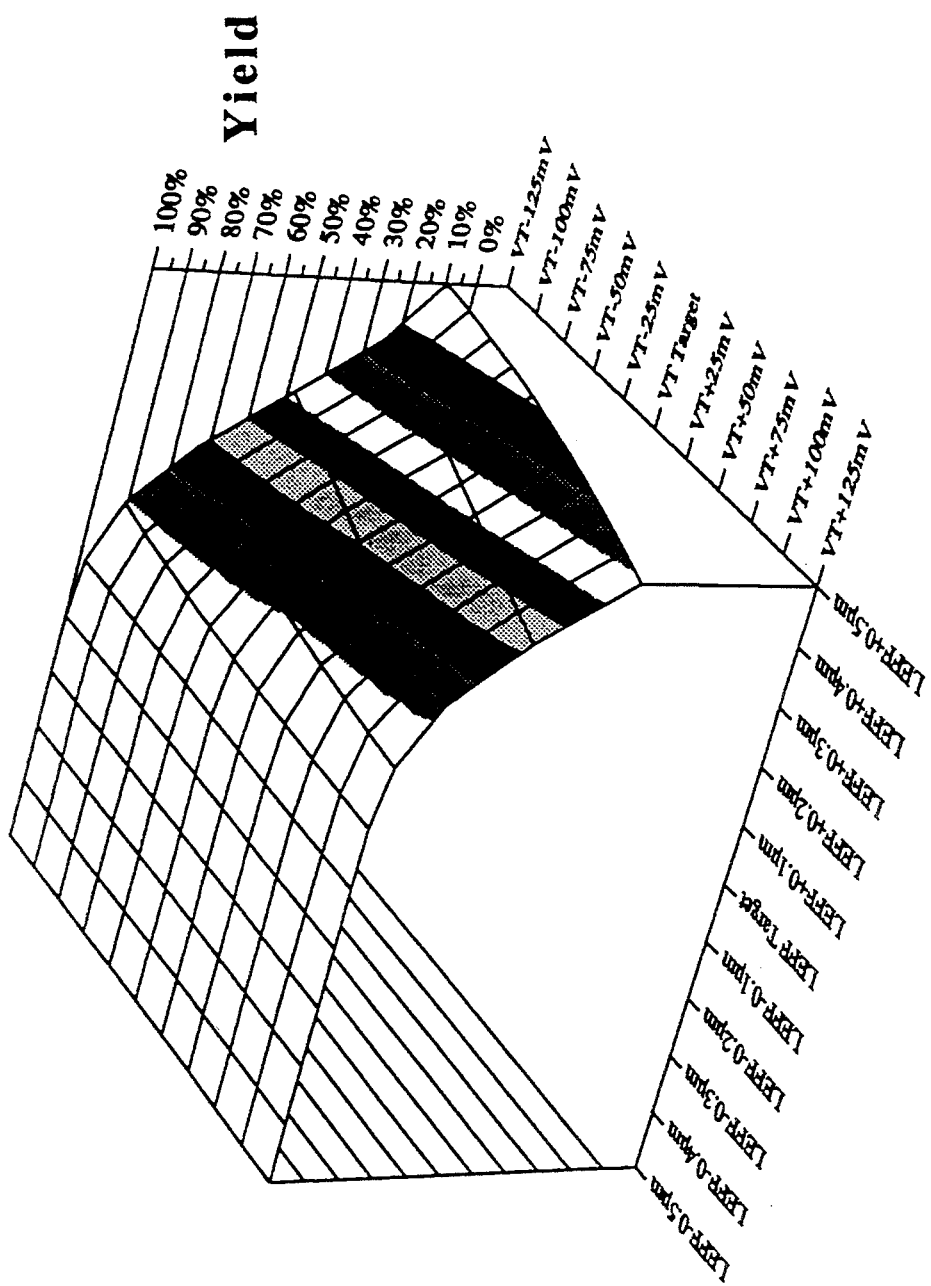
FIG. 6 is a Yield Surface of $V_{OH}$ of the buffer circuit of FIG. 1 generated in accordance with the present invention.

Again referring back to the equation for $C_{pk}$, and using $V_{OH}$ as an example of one particular circuit outcome, the sample mean, ($\overline{X}$), corresponds to a particular coordinate in the parametric space about which there is variation in $V_{OH}$. $X_j$ corresponds to the specification limit. The distance between the specification limit and the parametric coordinate is normalized to units of $V_{OH}$ variation. The standard deviation $S_X$ is analogous to the system variance of $V_{OH}$ about that parametric coordinate. Thus, the tail distribution associated with the Z—score represents the portion of $V_{OH}$ values from that population which will be out of specification. Conversely, one minus this tail probability represents the percent yield to that one outcome at that particular parametric coordinate. Hence, using the $C_{pk}$ surface, every $C_{pk}$ value can be utilized to calculate a corresponding yield. Therefore, a yield surface can be generated for each outcome as a function of the set of independent variables related thereto. FIG. 6, shows a yield surface for $V_{OH}$ as a function of channel length and $V_T$ for $V_{OH}$ at 85° C. for the buffer circuit of FIG. 1 with an assumed standard deviations for channel length and $V_T$ of 0.15 ]μm and 30 mV, respectively. The yield surface can be interpreted in a similar fashion as the $C_{pk}$ surface. The percent yield is read on the vertical axis and corresponds to the expected yield should the parametric distribution be centered at that particular coordinate in the channel length-$V_T$ plane. From FIG. 6, it can be seen that yield to $V_{OH}$ is 100% at low values of channel length and $V_T$ for buffer circuit 10. The predicted yield remains relatively flat as channel length is increased towards the process target. But even at the parametric target the yield is already beginning to dip below 100% parametric yield. This shows that even with the process centered at the targets, the variation in transistor properties is great enough that 100% of the $V_{OH}$ population is not contained within the specification limit. This result would not be evident from a response surface analysis of $V_{OH}$, and is only obtainable when the circuit performance, the transistor variation, and the specification limit are simultaneously taken into account. Predicted yield for $V_{OH}$ falls precipitously beyond the process targets.

Figure 7:
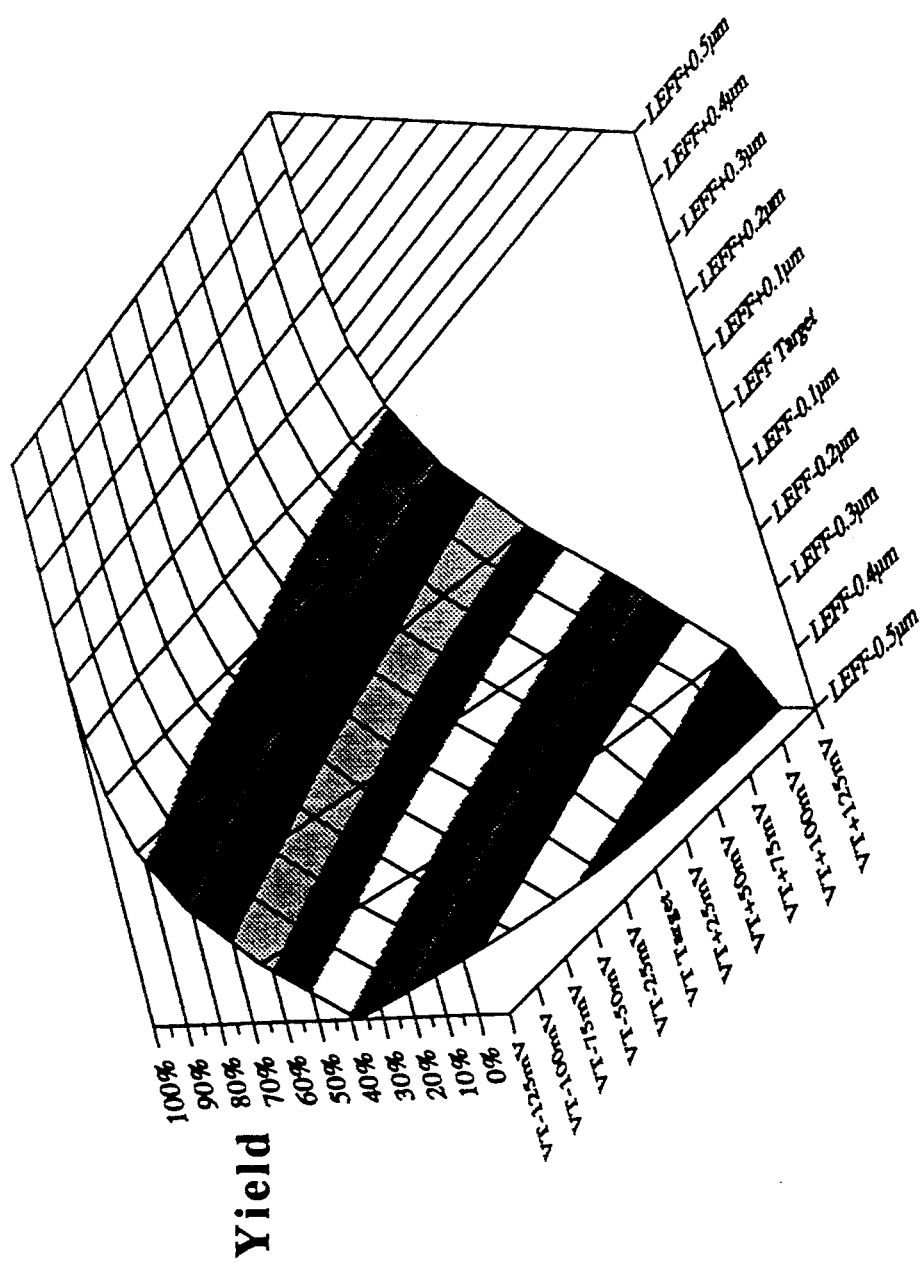
FIG. 7 is a Yield Surface of Leakage Current of a circuit incorporating the buffer circuit of FIG. 1 generated in accordance with the present invention.

Using the above described method, a yield surface can similarly be generated for the outcome of leakage current, $I_{SS}$, as shown in FIG. 7 with standard deviations for channel length and $V_T$ of 0.15 μm and 30 mV respectively. Similarly, yield surfaces can be generated for all desired circuit outcomes as a function of the transistor properties. Some of these outcomes may be the propagation delay of the buffer circuit, $V_{OL}$ and quiescent leakage current, to name a few.

Figure 8:
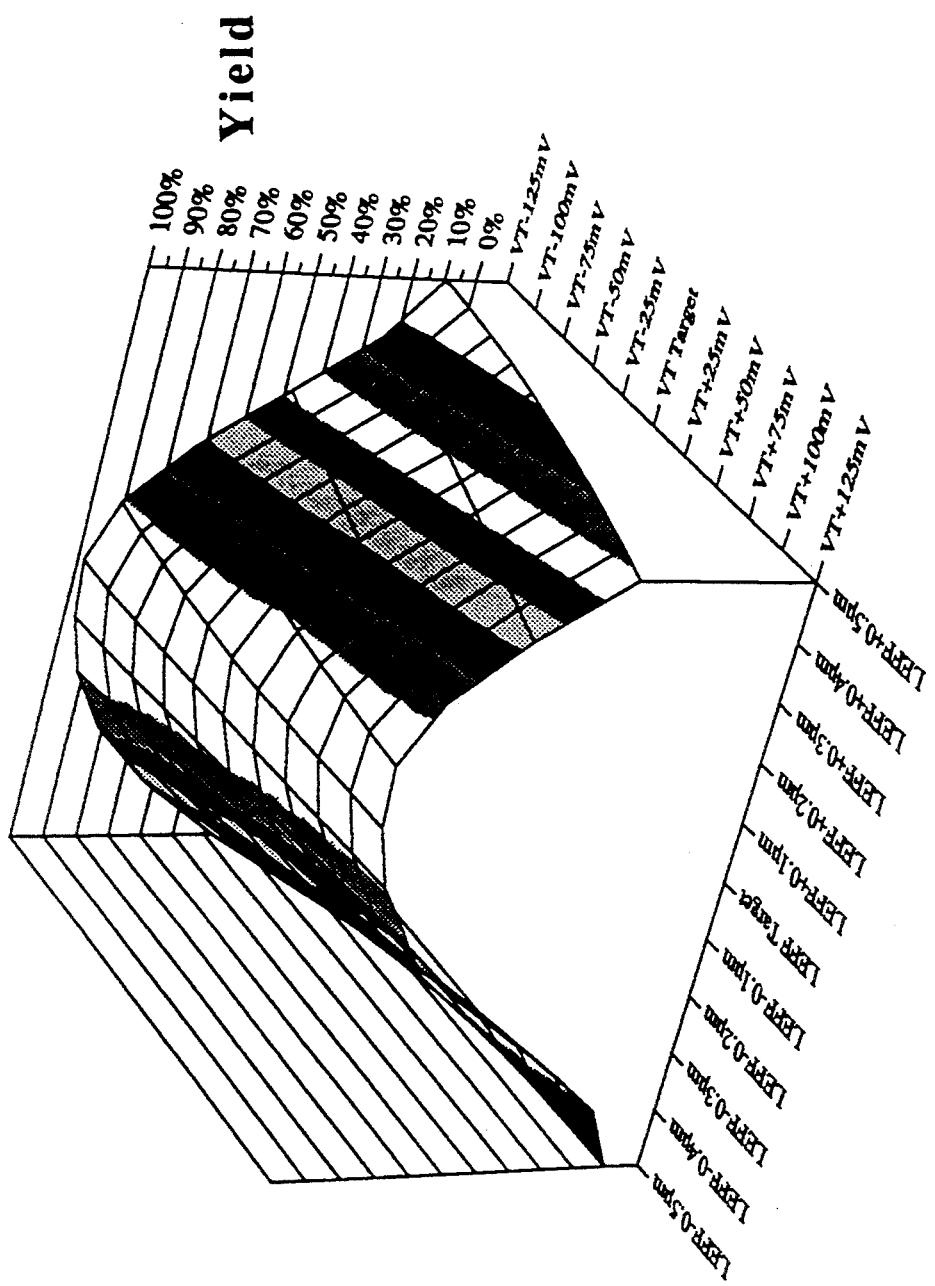
FIG. 8 is a composite Yield Surface for both $V_{OH}$ and Leakage Current of the buffer circuit of FIG. 1 generated in accordance with the present invention.

After all the yield surfaces for each discrete circuit outcome have been derived it is necessary, in order to predict overall parametric yield or to identify an optimum parametric target, to consider all outcomes simultaneously. This is done by creating a composite yield surface for multiple outcomes. To generate a composite yield surface it must be realized that the highest possible yield achievable at any parametric point is simply the minimum of all the discrete yield surfaces at that coordinate. In other words:

$$\text{Max \% Yield } (X_1, \ldots, X_N) = \text{MIN } \{Y_1(X_1, \ldots, X_N), \ldots, Y_M(X_1, \ldots, X_N)\}$$

where $(X_1, \ldots, X_N)$ represents the coordinate in the N-dimensional parametric space and $(Y_1, \ldots, Y_M)$ are the M discrete yield outcomes at that parametric coordinate to various performance indices. Referring to FIG. 8 there is shown a composite yield surface generated in accordance with the present invention, using the Wing Z spreadsheet, for the discrete outcomes $V_{OH}$ and leakage current, $I_{SS}$, for channel length and $V_T$ of buffer circuit 10. Again the standard deviation for channel length $L_{EFF}$ and $V_T$ were set at 0.151μm and 30 mV respectively. As can be seen, with the given parametric targets for $L_{EFF}$ and VT, the optimum % yield for $V_{OH}$ and $I_{SS}$ is less than 100%. This means that with variations in the transistor properties and the design, the known variation in the factory, and the given specification limits, there is no operating point at which the process can be targeted to provide 100% parametric yield. Either different targets for $L_{EFF}$ and $V_T$ must be selected or design changes must be made given the transistor properties or process variation reduced, or specification limits relaxed.

The foregoing has looked at the discrete outcomes of $V_{OH}$ and $I_{SS}$ for the output buffer circuit 10 and the IC containing buffer circuit 10 respectively. A similar analysis can be made with respect to $V_{OL}$ and other outcomes in conjunction with NMOS transistor 14.

Hence, what has been described is a method of evaluating and optimizing integrated circuit yields with respect to the transistor parametric variation seen in the processing environment. The method is based on 1) determining a regression or functional model using known techniques by, for example,(a) utilizing proper experimental design, (b) using statistical analysis of the results of the designed experiments resulting in a functional relationship between circuit performance and transistor properties and design variables, 2) generation of a response surface for the desired discrete outcomes as a function of the transistor properties and part performance, 3) converting the response surfaces to $C_{pk}$ surfaces for all combinations of the variables, 4) converting each $C_{pk}$ surface to a corresponding percent yield surface, and combining each percent yield surface to produce a composite yield surface containing all desired parametric operating points of the outcomes for the circuit as a percent yield of the circuit for a known manufacturing process.

What is claimed is:

1. A computer implemented method of evaluating and optimizing integrated circuit yields with respect to transistor parametric variations and/or design and process variables and/or alternatives seen in the process for fabricating the integrated circuits wherein the integrated circuits have a given set of outcomes that are a function of a given set of independent variables and which meet stated specification limits, comprising the steps of:

providing a predetermined set of independent variables that are related to the integrated circuit function to which predetermined desired ones of the outcomes are functionally related;

obtaining a data set for each of said outcomes as related to said set of independent variables;

deriving a regression or functional model for each of the desired outcomes as a function of the given set of independent variables;

generating respective response surfaces from each of said regression or functional models;

converting each respective response surface to a normalized process capability index or Z-value surface for all combinations of the independent variables;

converting each process capability index to a respective percent yield surface;

combining each of said percent yield surfaces into a two or more-dimensional composite percent yield surface containing all desired parametric operating points of the outcomes associated with the integrated circuit;

using the computer to implement a two or more-dimensional composite percent yield surface plot from said combining step;

selecting a value of the at least one of the predetermined set of independent variables from the two or more-dimensional composite yield surface plot to provide a desired yield; and adjusting the design and process variables seen in the process for fabricating the integrated circuits such that the at least one of the predetermined set of independent variables has the selected value to provide the desired yield.

2. The method of claim 1 wherein said step for deriving a regression or functional model includes:

determining an experimental design to provide controlled variations of the independent variables over a range consistent with the known process and design variations so as to derive said data set; and deriving said regression or functional model for each of the circuit outcomes from said experimental design and said data set using response surface modeling methodology.

3. The method of claim 2 wherein said step of converting each response surface to a process capability index surface includes using a statistical method for estimating system variance of each outcome based on known process variation of the independent variables to produce a respective process capability index value and converting each index value into the parametric percent yield of all operating points for all combinations of the independent variables.

4. A computer implemented method for calculating overall system yield to thereby provide for the selection of an optimum parametric operating point of an operational system to maximize yields of such system to a required set specification wherein the system has a given number of outcomes associated therewith that are a function of a given set of independent variables, comprising the steps of:

employing a predetermined set of independent variables to which predetermined system outcomes are functionally related;

determining a regression or functional model for each outcome as a function of the given set of independent variables;

converting each regression or functional model to a normalized process capability index value for all combinations of the independent variables;

converting each of the process capability index values to a corresponding percent yield value for all combinations of the independent variables wherein a percent yield surface is formed within the given set specification limit;

combining certain ones or all of the percent yield surfaces into a two or more-dimensional composite percent yield surface containing all desired parametric operating points of the outcomes with respect to expected parametric variations of the set of independent variables;

using the computer to implement a two or more-dimensional composite yield surface plot from the combining step which plot is used to evaluate the percent yield of said operating points with respect to said parametric variations of the set of independent variables;

selecting a value of the at least one of the predetermined set of independent variables in accordance with the two or more-dimensional composite yield surface plot to provide a desired yield: and adjusting the operational system such that the at least one of the predetermined set of independent variables has the selected value to provide the desired yield.

* * * * *